United States Patent [19]

Graf et al.

[11] Patent Number: 4,670,237

[45] Date of Patent: Jun. 2, 1987

[54] PROCESS OF REMOVING POLLUTANTS FROM EXHAUST GASES

[75] Inventors: Rolf Graf, Friedrichsdorf; Lothar Reh; Michael Schröter, both of Frankfurt am Main, all of Fed. Rep. of Germany

[73] Assignee: Metallgesellschaft AG, Frankfurt am Main, Fed. Rep. of Germany

[21] Appl. No.: 834,498

[22] Filed: Feb. 26, 1986

Related U.S. Application Data

[63] Continuation of Ser. No. 620,460, Jun. 14, 1984, abandoned.

[30] Foreign Application Priority Data

Jun. 21, 1983 [DE] Fed. Rep. of Germany ....... 3322159

[51] Int. Cl.$^4$ .......................... B01J 8/00; C01B 17/00
[52] U.S. Cl. ................. 423/244; 423/210; 423/240; 423/242
[58] Field of Search .......... 423/242 A, 242 R, 244 A, 423/244 R, 210, 240 R, 242 S

[56] References Cited

U.S. PATENT DOCUMENTS 4,442,079  4/1984  Donelly et al. .................. 423/244
4,454,100  6/1984  Faatz .............................. 423/242
4,495,165  1/1985  Nguyen ........................... 423/242

FOREIGN PATENT DOCUMENTS 1183937   3/1970  United Kingdom ............. 423/244
1336563  11/1973  United Kingdom ............. 423/244

Primary Examiner—Gregory A. Heller
Attorney, Agent, or Firm—Felfe & Lynch

[57] ABSTRACT

In a process of removing pollutants consisting substantially of sulfur oxides from exhaust gases at temperatures below 150° C. by means of a sorbent which contains calcium carbonate, calcium oxide and/or calcium hydroxide and which is included in a circulating fluidized bed system consisting of a fluidized bed reactor, a separator and a return line, a complete utilization of the sorbent is achieved in that a partial stream of laden sorbent is withdrawn from the circulating fluidized bed and is subjected at a temperature of 600° to 1200° C. to an oxidizing treatment, a major part of the sorbent that has been subjected to an oxidizing treatment is recycled to the circulating fluidized bed, and a partial stream which contains the sorbent mainly in the form of calcium sulfate is removed from the process. Fresh sorbent is supplied to the circulating fluidized bed and/or to the stage for the oxidizing treatment at the rate at which said partial stream is removed from the process.

18 Claims, 1 Drawing Figure

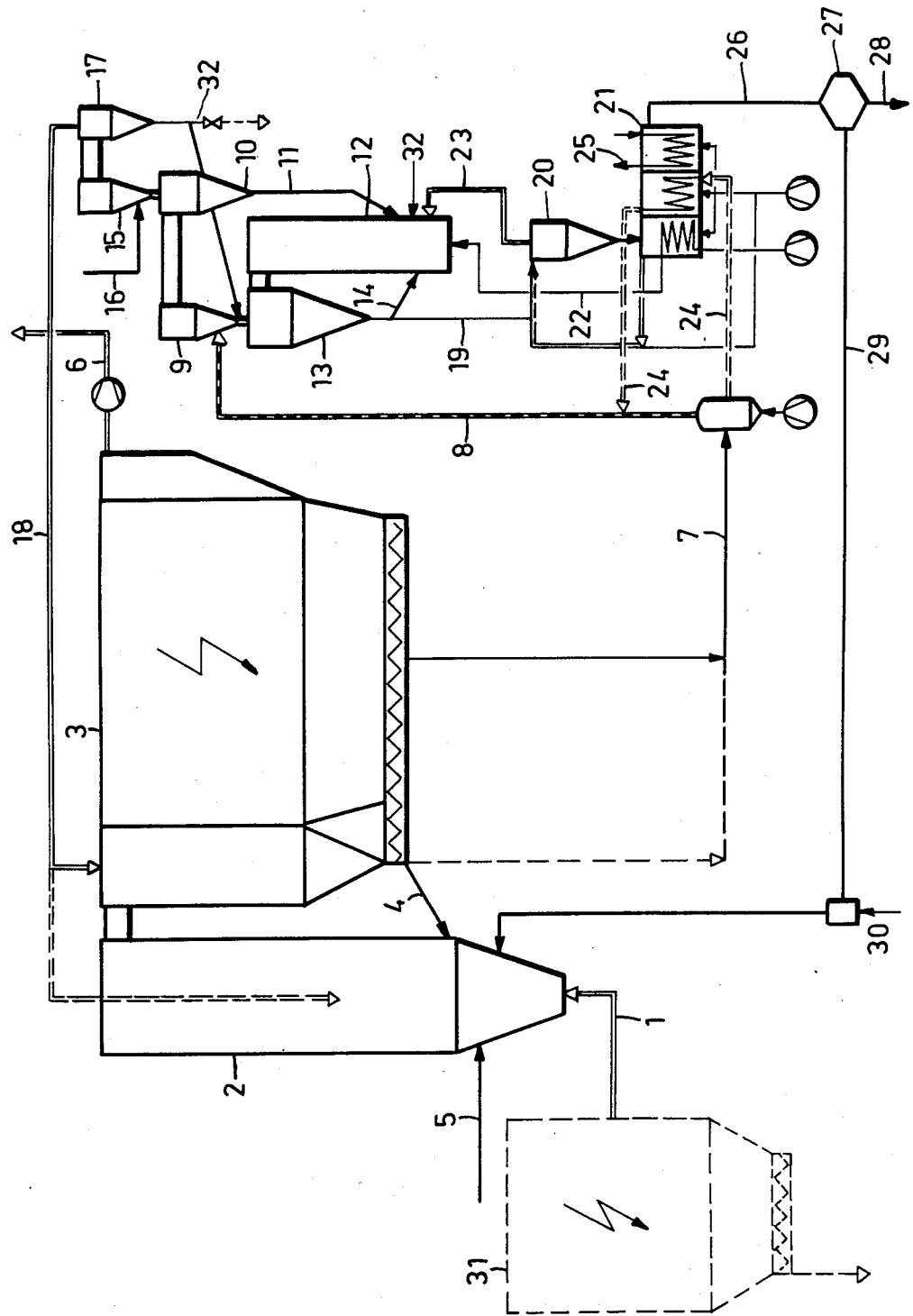

PROCESS OF REMOVING POLLUTANTS FROM EXHAUST GASES

This application is a continuation of application Ser. No. 620,460, filed June 14, 1984, now abandoned.

BACKGROUND OF INVENTION

This invention relates to a process of removing pollutants, consisting substantially of sulfur dioxides, from exhaust gases at temperatures below 150° C. by means of a sorbent which contains calcium carbonate, calcium oxide and/or calcium hydroxide and which is included in a circulating fluidized bed system consisting of a fluidized bed reactor, a separator and a return line.

The combustion of fossil fuel results in the formation of flue gases, which, in dependence on the sulfur content of the starting material, may contain considerable amounts of sulfur oxides, particularly of sulfur dioxide. The exhaust gases produced in the continuously increasing number of refuse incinerating plants also contain sulfur oxides and, as a result of the incineration of plastics materials, which are always present in practice, contain hydrogen chloride and hydrogen fluoride as additional impurities. The legal provisions for the protection of the environment require such impurities to be removed from the gases before they are discharged into the atmosphere.

In by far the largest number of processes of purifying exhaust gases, the above-mentioned impurities are removed by wet-scrubbing, particularly with solutions or slurries of substances which will react with the pollutants (Ullmann's Encyclopädie der Techn. Chemie, 3rd edition, Volume 2/2 (1968), page 419).

Other processes effect a so-called dry purification of gas. That group also includes processes in which the sorbent is fed in a liquid phase or in which sorption is effected with an addition of water, provided that the liquid is transformed to the gas phase in the gas-purifying equipment. Steam may also be supplied instead of water. In said processes the gases are passed through a stationary bed of solids, such as activated carbon or brown coal coke, which react with the impurities. Exhaust gases can also be purified with the aid of a so-called moving bed of solids, which during their descent in the reactor are progressively laden and are finally discharged. Fresh solids at a rate corresponding to the discharge rate are supplied to the upper portion of the reactor (Meier zu Köcker "Beurteilung and Aussichten von Verfahren zur Rauchgasentschwefelung"; V.G.B. Kraftwerkstechnik 53 (1973), pages 516 et. seq.).

In another known process, e.g., sulfur oxides are removed from gases in that adsorbents are pneumatically charged into the gases to be purified, the resulting gas-solids dispersion is pneumatically moved through a reaction zone and subsequently through a holding zone, and the solids are subsequently separated from the gas. After certain regenerating steps have been performed, a partial stream of solids is finally recycled to the gas-purifying equipment (U.S. Pat. No. 3,485,014).

It is also known to remove pollutants from flue gases in a dry process in equipment which is connected to the flue of the fuel-burning furnace and comprises a boiler operated at a flue gas temperature of 700° to 900° C. That equipment comprises a fluidized bed, which completely occupies the cross-section of the flue gas duct, and/or a circulating fluidized bed, which is fed with an absorbent consisting, e.g., of calcium carbonate and/or magnesium carbonate (Laid-open German Application No. 30 09 366). The gas supply bottom of the fluidized bed is suitably cooled.

The essential disadvantages of the wet-scrubbing processes reside in that the sludge, which contains the sulfites and sulfates that have become available and may also contain chlorides and fluorides, can be disposed of only with difficulties and that the purified exhaust gases must be reheated. The known dry purifying processes using a fixed bed or moving bed have the disadvantage that the absorbents are coarse-grained so that their ability to combine with the impurities contained in the exhaust gas is utilized only to a low degree and that the reactor must have considerable dimensions because the permissible gas velocity is relatively low and gases at relatively high rates must be purified.

The essential disadvantages of the process disclosed in U.S. Pat. No. 3,485,014 reside in the requirement to divide the gas stream that is to be purified and to precisely meter the absorbent in a suitable apparatus, which must be wear-resistant. Another disadvantage resides in that the residence time of the gases in the reaction zone is not long enough for an adequate removal of the impurities or a considerable overall height is required.

Difficulties involved in the removal of pollutants from flue gases from 700° to 900° C. in accordance with Laid-Open German Application No. 30 09 366 reside in that the furnace must be controlled to provide flue gases at a temperature in the range from 700° to 900° C. whereas the flue gases are usually hotter as they leave the combustion chamber and are usually cooler as they leave the waste-heat boiler.

A disadvantage which is common to all dry purifying processes resides in that it is virtually impossible to use the sorbent to the same degree as in wet-scrubbing processes. Besides, in most cases the laden sorbent consists of a mixture of calcium sulfite and calcium sulfate and can be utilized only with difficulty and must usually be disposed of in a special dump.

In connection with the removal of sulfur oxides from flue gases in spray driers by means of lime-containing suspensions (Laid-open German Application No. 31 35 200) or in connection with the desulfurization of flue gases with solutions of suspensions of basic adsorbents, which are transformed to dry sulfite and sulfate (European Publication No. 74,772), it is known to subject the laden sorbents to an oxidizing treatment resulting in a formation of calcium sulfate. Whereas the problem of a disposal of wastes can be avoided to a large extent by said processes, they do not permit a utilization of the sorbent to a higher degree.

SUMMARY OF THE INVENTION

It is an object of the invention to provide a process which is free of the disadvantages of the known gas-purifying processes, can be carried out in a simple manner, can be carried out with most inexpensive sorbents, and ensures a utilization of the sorption capacity of the sorbents to a high degree.

To accomplish this object, the process of the kind described first hereinbefore is carried out in accordance with the invention in such a manner that 1. a partial stream of laden sorbent is withdrawn from the circulating fluidized bed and is subjected to an oxidizing treatment at a temperature of 600° to 1200° C.;
2. a predominating part of the sorbent which has been subjected to the oxidizing treatment is recycled to the circulating fluidized bed and a partial stream which contains the used sorbent mainly in the form of calcium sulfate is removed from the process;

3. fresh sorbent at a rate corresponding to the rate at which used sorbent is removed from the process is fed to the circulating fluidized bed and/or to the stage in which the oxidizing treatment is carried out.

From an "orthodox" fluidized bed, in which a dense phase is separated by distinct step in density from the overlying gas space, an expanded or circulating fluidized bed as is used in accordance with the invention differs in that it involves states of distribution having no defined boundary layer. There is no distinct step in density between a dense phase and the overlying gas space but the solids concentration in the reactor decreases gradually from bottom to top.

The state of the fluidized bed in the fluidized bed reactor is so controlled that the following ranges are obtained, which are defined by the Froude and Archimedes numbers:

$$1 \leq \tfrac{3}{4} \times F_r^2 \times \frac{\rho_g}{\rho_k - \rho_g} \leq 20$$

or $$1 \leq Ar \leq 100$$

wherein $$Ar = \frac{d_k^3 \times g (\rho_k - \rho_g)}{\rho_g \times \nu^2}$$

and $$F_r^2 = \frac{u^2}{g \times d_k}$$

In said formulas
u = the relative gas velocity in m/sec.
Ar = the Archimedes number
$F_r$ = the Froude number
$\rho_g$ = the density of gas in kg/m$^3$
$\rho_k$ = the density of the solid particle in kg/m$^3$
$d_k$ = the diameter of the spherical particle in m
$\nu$ = the kinematic viscosity in m$^2$/sec
g = the gravitational constant in m/sec$^2$ To achieve a high throughput rate for the exhaust gas and a removal of pollutants to a high degree owing to a thorough mixing of solids and gas, the gas velocity in the fluidized bed reactor is suitably adjusted to 1 to 10 m/sec (stated as an empty pipe velocity).

The mean suspension density in the fluidized bed reactor may vary within wide limits, e.g., in the range from 0.1 to 100 kg/m$^3$. It will be particularly desirable to use suspension densities in the lower portion of that range because in that case the pressure loss in passing the exhaust gas through the fluidized bed will be particularly small. A mean suspension density of 0.2 to 2 kg/m$^3$ will be particularly desirable from this aspect.

An optimum mixing of the solids and gas can be promoted in that the rate at which the solids are circulated per hour is 20 to 150 times the quantity of solids contained in the shaft of the fluidized bed reactor.

The circulating fluidized bed may be formed with the aid of a fluidized bed reactor, a cyclone separator and a recycling line, which opens into the lower portion of the fluidized bed reactor. In that case a major part of the quantity of solids is separated by the cyclone separator. For the removal of fines, the gas stream leaving the cyclone separator is subjected to a fine purification, e.g., in an electrostatic precipitator.

The cyclone separator and a succeeding electrostatic precipitator for separating the sorbent entrained by the gases leaving the fluidized bed reactor may be replaced by an electrostatic precipitator which serves the same purpose and directly succeeds the fluidized bed reactor. In the latter case the pressure loss of the gas passing through the fluidized bed separator and the separator will be further reduced.

If a multiple-field electrostatic precipitator is used, the solids entrained by the gases leaving the reactor may be collected in fractions differing in particle size and composition. In that case at least the coarser solids fraction collected in the field which is entered first by the gas can be recycled to the fluidized bed whereas the solids collected in the field which is subsequently entered by the gas can be subjected to the oxidizing treatment.

The fluidized bed reactor used for the purification of exhaust gas may be rectangular or square or circular in cross-section. The gas-distributing means may consist of a grate provided with nozzle orifices. But particularly in reactors which are large in cross-section and when the gas throughput rates are high it will be desirable to provide the fluidized bed reactor with a conical lower portion and to charge the exhaust gas through a venturi-like nozzle. The latter design is particularly desirable because it involves a particularly low pressure loss and is not liable to be deranged by clogging and wear.

The sorbent may usually have a particle size of dp$_{50}$ up to 300 μm and may be charged into the fluidized bed reactor in any conventional manner, e.g., through penumatic troughs. The sorbent may be alternatively be supplied in the form of an aqueous suspension, and in that case will suitably be charged through lances. Charging elements in a relatively small number will be sufficient because an effective transverse mixing takes place in a circulating fluidized bed.

The dry purification may be effected under pressures in a very wide range, e.g., up to about 25 bars. A superatmospheric pressure will particularly be employed if the exhaust gases becomes available under a superatmospheric pressure, e.g., because the process in which the exhaust gas becomes available is carried out under a superatmosperic pressure. In general, however, the exhaust gas will be purified under a pressure of about 1 bar.

A partial stream of laden sorbent is preferably continuously withdrawn from the circulating fluidized bed and is subjected to an oxidizing treatment at 600° to 1200° C. By that treatment, calcium sulfite contained in the partial stream is transformed to calcium sulfate. The oxidizing treatment may be carried out in any desired unit, which may also be suitable for carrying out combustion processes. The oxidizing treatment may be carried out in an orthodox fluidized bed or to special advantage in a circulating fluidized bed. In addition to the formation of calcium sulfate as described hereinbefore, the oxidizing treatment results in a virtually complete afterburning of carbon particles or incompletely burnt ash particles which have been entrained by the exhaust gases into the stage for the sorption of pollutants.

To ensure that any calcium carbonate which has been freshly supplied or has been formed possibly by a secondary reaction, will be transformed to calcium oxide, which is more active in the removal of pollutants, a preferred feature of the invention resides in that the oxidizing treatment is carried out at a temperature in the range of 800° to 1000° C. Any surplus heat which may be generated in that treating stage may be dissipated by means of cooling surface, e.g., with a generation of steam. The cooling surface may be accommodated by the unit in which the oxidizing treatment is carried out or by a separate unit, which is contacted on the outside by a stream of the sorbent which has been or is to be treated.

The sorbent leaving the oxidizing treatment stage is subsequently cooled. A major part of that sorbent is recycled to the circulating fluidized bed of the sorption stage, and another part is removed. The rates of the partial stream will depend on the pollutant content of the exhaust gases to be purified and on the degree to which the pollutants are removed, i.e., on the rate at which calcium sulfate is formed.

The above-mentioned cooling of the sorbent after the oxidizing treatment may be effected in any desired conventional equipment. Fluidized bed coolers are particularly suitable for that purpose. In accordance with a further preferred feature of the invention the final cooling phase is effected by a direct injection of water, whereby highly reactive calcium hydroxide is formed. The water should be supplied at such a rate that a water vapor content up to 30% by volume is obtained in the fluidized bed reactor of the circulating fluidized bed system.

To provide for a utilization of the sensible heat of the exhaust gases leaving the oxidizing treatment stage, a desirable embodiment of the invention provides for the use of said heat for preheating of the sorbent to be subjected to the oxidizing treatment. That preheating is most suitably effected in a single-stage or two-stage suspension heat exchanger. (As to suspension heat exchanger see for example U.S. Pat. No. 3,579,616).

The preheating which is linked simultaneously to an oxidation of the calcium sulfite to sulfate is carried out in such a manner that prior to the entry (introduction) of the preheated material in the actual oxidation reactor a partial stream of material predominantly consisting of calcium sulfate is sluiced off (drawn off). In this event the fresh sorption agent is added directly into the actual oxidation reactor which is relieved (of a load) due to the preceding sluicing off of the calcium-sulfate-rich material with respect to the solid material charge.

The relief (unburdening) of the oxidation reactor is also achieved if the fresh sorption agent is fed into the preheating stage and the charged sorption agent from the sorption step (stage) is fed directly into the oxidation reactor.

The preheating may be combined with a treatment by which heavy metals and halides, particularly chlorides, are removed from the sorbents to be subjected to the oxidizing treatment. For this purpose another desirable embodiment of the invention provides for an addition of water or milk of lime to the gas stream leaving that suspension heat exchanger stage which is the last stage in the direction of gas flow. In that case said impurities can be collected in a succeeding cyclone.

If halides and heavy metal compounds are contained in the exhaust gas, they may be separately removed in that the halides are removed first by a treatment with milk of lime and the heavy metals are subsequently removed by a treatment with water at lower temperatures.

If the oxidizing treatment is desired to provide a product which can be removed and has approximately the same calcium sulfate content as natural gypsum, fine dust, particularly ash, will desirably be removed from the exhaust gases to be purified before said gases are fed to the circulating fluidized bed of the sorption stage. Such fine dust can be removed in the simplest manner by means of an electrostatic precipitator.

A higher calcium sulfate content can be achieved in a preferred embodiment of the invention in which the product of the oxidizing treatment is classified, e.g., by air separation. In that case the fraction which contains less calcium sulfate may be recycled to the stage for the sorption and the oxidizing treatment so that said fraction will be further enriched with calcium sulfate.

The calcium sulfate content of the sorbent which has been removed from the process can also be influenced in that, in accordance with a further feature of the invention, the fine-grained fraction of the sorbent is preferentially charged into the stage for the oxidizing treatment. The fine-grained fraction has a higher content of calcium-sulfur compounds. The fine-grained fraction can be recovered in a simple manner by a classifying separation of the sorbent which has been entrained by the exhaust gases leaving the fluidized bed reactor; such separation can be effected; e.g., in a separating cyclone and an electrostatic precipitator, which may comprise a plurality of fields. If only the fine-grained fraction is charged to the stage for the oxidizing aftertreatment, the total rate of sorbent handled by said stage will be minimized.

The process in accordance with the invention is of universal utility, particularly in the purification of flue gases from furnaces of power plants or refuse incinerating plants. Exhaust gases from other industrial processes can also be purified, provided that their pollutant content consists substantially of sulfur dioxides. In addition to sulfur compounds, $NO_x$, hydrogen chloride, hydrogen fluoride and compounds thereof as well as heavy metals can be removed. The advantage of the process in accordance with the invention reside in that it can be carried out behind existing plants without an alteration or with only insignificant alterations thereof, that the gas which has been purified need not be aftertreated, and that very high exhaust gas throughput rates can be achieved per unit of area of the fluidized bed reactor. Because a large quantity of sorbent is circulated in the circulating fluidized bed and has a strong buffer action, the process can be used for a reliable purification even of exhaust gases having a strongly fluctuating pollutant content without a need of a high control expenditure.

The sorbent which is used is laden in a near-stoichiometric proportion because the unreacted calcium carbonate or the calcium carbonate formed by a combination with carbon dioxide in the sorption stage will be decomposed to form calcium oxide and carbon dioxide in the succeeding oxidizing treatment and after its recycling, and optional hydration by injected water, is again available as a sorbent. Unburnt carbon contained in the fine dusts can be substantially reacted in the stage for the oxidizing treatment so that the undesired residual carbon content of the end products can be decreased greatly below 1% and the energy yields can be improved, particularly in conjunction with furnaces effecting a combustion only to a low degree. A good heat balance can be achieved in that manner even by an only partial heat exchange between the hot streams of solids and gases leaving the oxidizing treatment and the entering cold streams of solids. In case of a recovery of heat to a high degree, energy, e.g., in the form of steam, may be delivered for further use.

In that variant of the process in which fine dust is removed from the exhaust gases before they enter the sorption stage, the product obtained in the stage for the oxidizing treatment will have a very high calcium sulfate content in excess of 95%, which is comparable to that of natural gypsum, so that said product can be used as a substitute for gypsum anhydride, e.g., in mining, in the cement and gypsum industries, as a setting control agent, a filter aid or filler. In an adequate heat exchange is effected, there will be a surplus of heat in the stage for the oxidizing treatment in this variant even if calcium carbonate is used as a sorbent. For an additional heat supply, a burner for an initial heating up may be operated during the process.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWING

The drawing is a schematic representation of the process in accordance with the invention.

DESCRIPTION OF PREFERRED EMBODIMENT

The flue gases which become available, e.g., in a furnace, are fed in line 1 to a circulating fluidized bed system consisting of a fluidized bed reactor 2, a separator 3 (which in the present embodiment consists of an electrostatic precipitator) and a recycling line 4. The gas inlet portion of the fluidized bed reactor 2 is similar to a venturi tube. Sorbent is supplied through a lance 5. After a removal of dust in the electrostatic precipitator, the flue gas is conducted in line 6 to a chimney or to a cooling tower (not shown).

A partial stream of laden sorbent is withdrawn in line 7 from the circulating system 2, 3, 4 and is fed by a pneumatic conveyor 8 to the suspension heat exchanger 9 of the stage for the oxidizing treatment. The sorbent is separated from the gas in the cyclone separator 10 and for the oxidizing treatment is fed through a downcomer 11 to another circulating fluidized bed system, which consists of a fluidized bed reactor 12, a cyclone separator 13 and a recycling line 14 and in which the calcium-sulfur compound is oxidized to form calcium sulfate and any entrained carbon particles are burnt.

The exhaust gases from the oxidizing treatment are passed through the suspension heat exchanger 9 and the cyclone separator 10 and are then fed to another suspension heat exchanger 15, in which milk of lime or water supplied through line 16 is added for a removal of halides and/or heavy metal compounds. Thereafter, additional solids are removed from the exhaust gases in the separating cyclone 17, from which the exhaust gases are fed in line 18 to the sorption stage for a removal of dust formed by the oxidizing treatment. Halides and/or heavy metal compounds are withdrawn in line 32 from the separating cyclone 17 at the rate at which they are supplied in the exhaust gases that are to be purified.

Regenerated sorbent is withdrawn in line 19 from the stage for the oxidizing treatment and is charged through a cyclone separator 20 into a three-stage fluidized bed cooler 21. In the latter, the sorbent is cooled in conjunction with an indirect heating of air, which is supplied to the fluidizing bed reactor 12 as a fluidizing gas through line 22, and with a direct heating of air, which after a removal of dust in a cyclone separator 20 is used as secondary air supplied in line 23. An additional cooling may be effected in conjunction with a heating of sorbent, which is conducted in line 24 and subsequently subjected to the oxidizing treatment. In the third stage a cooling is effected by means of cooling surfaces 25, which are suspended in the cooling chamber and supplied with water.

Cooled regenerated sorbent is withdrawn in line 26 and is classified, e.g., in an air separator 27. Part of the solvent is removed from the process as a product in line 28. A major part is recycled in line 29 to the sorption stage. Before introduction water is injected at 30.

In the embodiment of the invention providing for a cooling of dust from the exhaust gas before it enters the sorption stage, the line 1 is preceded by the electrostatic precipitator 31 indicated by dotted lines.

All or part of the sorbent may be supplied through line 32 rather than through line 5.

EXAMPLE 1

The gas to be purified was a flue gas from a coal-firing furnace. That flue gas became available at a temperature of 140° C. and at a rate of 400,000 m$^3$/h (STP) and under standard temperature and pressure conditions contained 2000 mg/m$^3$ SO$_2$ and
6000 mg/m$^3$ ash (containing 5 wt.% C)

The fluidized bed reactor 2 used for the sorption treatment had in its cylindrical portion a diameter of 5.6 m and a height of 15 m.

When substantially all dust had been removed from the flue gas in the electrostatic precipitator 31, the flue gas was supplied to the fluidized bed reactor 2 in line 1. Quartz sand having a mean particle size of 200 $\mu$m, and calcium hydroxide having a mean particle size of 5 $\mu$m were supplied through line 5 at the rates of 1 kg/h and 950 kg/h respectively.

In the fluidized bed reactor 2, the gas velocity was 6 m/sec (stated as empty-pipe velocity), the mean suspension density amounted to about 0.4 kg/m$^3$, and the temperature resulting from the mixing of the flue gas and the solids contained in the circulating fluidized bed was 80° C.

The solids-gas suspension leaving the fluidized-bed reactor 2 at its top had under standard conditions of temperature and pressure a suspension density of 400 g/m$^3$ and was then fed to the two-field electrostatic precipitator 3. Solids at a rate of 159 metric tons per hour were collected in the dust bin. A major part of said solids was recycled through line 4 to the lower portion of the fluidized bed reactor 2. Solids at a total rate of 7 metric tons per hour were discharged through line 7 and consisted substantially of a mixture of calcium sulfite, calcium sulfate, calcium carbonate and unreacted calcium hydroxide.

The exhaust gas withdrawn through line 6 contained under standard conditions of temperature and pressure
200 mg/m$^3$ SO$_2$ and 25 mg/m³ dust
This means that the supply of calcium hydroxide in a stoichiometric proportion of 1.02:1 relative to sulfur oxide, in dependence on the SO₂ content of the flue gas, resulted in a removal of 90% of the sulfur dioxide content.

The solids removed from the sorption system in line 7 were preheated in the suspension heat exchanger 9 with the exhaust gases from the fluidized bed reactor 12, which exhaust gases were at a temperature of 850° C. The preheated solids were then fed to the fluidized bed reactor 12, which was 0.6 m in diameter. The fluidized bed reactor was supplied through line 22 with air at a rate of 700 m³/h (STP), which air had been indirectly preheated to 530° C. in the fluidized bed cooler 21, and was supplied through line 21 with air at a rate of 1300 m³/h (STP), which air had been preheated to 700° C. by a direct heat exchange in the fluidized bed cooler 21. In the fluidized bed reactor 12, the temperature was 850° C. and the suspension density above the secondary air inlet 23 was about 40 kg/m³.

Oxidized solids were withdrawn at a rate of 7 metric tons per hour from the circulating fluidized bed system 12, 13 and 14 in line 19 and were cooled to an end temperature of 100° C. in the fluidized bed cooler 21 operating at a fluidizing gas velocity of 0.4 m/sec. and divided into two partial streams in the air separator 27. The higher specific gravity fraction amounted to 1.6 metric tons per hour and consisted of 95.5% calcium sulfate, balance mainly calcium oxide, and was removed from the process through line 28. Water, at a rate of 14.3 metric tons per hour, was injected at 30 into the fraction having a lower specific gravity for a transformation of the calcium oxide to calcium hydroxide. That fraction was then recycled to the fluidized bed reactor 2. Under the stated conditions of heat exchange, the overall heat balance involved a surplus of 0.4 MW, which was dissipated through the cooling surface 25.

EXAMPLE 2

In a modification of Example 1, calcium carbonate at a rate of 1.28 metric tons per hour rather than calcium hydroxide was supplied through line 5. In that case, solids at a rate of 19.5 metric tons per hour were withdrawn through line 7 and fed to the stage for the oxidizing treatment.

In that case too, a desulfurization of 90% was achieved with a Ca/S ratio of 1.02:1. A mixture consisting of calcium sulfate at a rate of 1.53 metric tons per hour and calcium oxide at a rate of 70 kg/h was removed from the process through line 28. Solids at a rate of 18 metric tons per hour was recycled through line 29. Water was charged at a rate of 15.0 metric tons per hour. In that variant of the process, 0.1 MW energy had to be supplied for a heat balance.

EXAMPLE 3

In a modification of Example 1, no dust was collected from the flue gas which was fed from the furnace to the fluidized bed reactor 2. Calcium carbonate at a rate of 1.38 metric tons per hour rather than calcium hydroxide was charged through line 5.

A major part of the solids withdrawn through line 7 at a rate of 26 metric tons per hour consisted of fine dust that had been completely burnt. Said solids also contained unburnt carbon in an amount of 5% of the dust that had come from the furnace; that carbon was completely burnt in the fluidized bed reactor 12. For this reason the heat balance involved a surplus of 1 MW, which was dissipated in the form of steam. With a Ca/S ratio of 1.1:1, 90% of the SO₂ was removed. A product consisting mainly of calcium sulfate and fine dust was removed from the process through line 28 at a rate of 4 metric tons per hour and contained about 3.1 wt.% calcium oxide and less than 0.5% combustibles.

It will be understood that the specification and examples are illustrative but not limitative of the present invention and that other embodiments within the spirit and scope of the invention will suggest themselves to those skilled in the art.

We claim:

1. A process of removing pollutants consisting substantially of sulfur oxides from an exhaust gas comprising:
   introducing the exhaust gas at a temperature below 150° C. into a circulating fluidized bed system consisting of a fluidized bed reactor, a separator and a return line; introducing a calcium compound containing sorbent into the fluidized bed reactor for intimate contact with the flue gases to produce a laden sorbent; withdrawing a partial stream of said laden sorbent from the circulating fluidized bed and subjecting the partial stream to an oxidizing treatment at a temperature of 600° to 1200° C. to generate said sorbent; recycling a predominate part of the sorbent which has been subjected to the oxidizing treatment to the circulating fluidized bed; removing a partial stream which contains the used sorbent mainly in the form of calcium sulfate from the process; and introducing fresh sorbent into the process, at a rate corresponding to the rate at which used sorbent is removed from the process.

2. The process of claim 1, wherein the sorbent is calcium carbonate, calcium oxide, calcium hydroxide or mixtures thereof.

3. The process of claim 2, wherein the oxidizing treatment is carried out in a fluidized bed, preferably in a circulating fluidized bed.

4. The process of claim 2, wherein the oxidizing treatment of the withdrawn partial stream of sorbent is effected at a temperature in the range of 800° to 1000° C.

5. The process of claim 2, wherein the sorbent that has been subjected to the oxidizing treatment for recycle is activated by a direct injection of water.

6. The process of claim 2, wherein the sorbent is preheated with the exhaust gases from the oxidizing treatment.

7. The process of claim 2, wherein the exhaust gas contains fine dust which is removed, preferably by means of an electrostatic precipitator before said exhaust gas is introduced into said circulating fluidized bed.

8. The process of claim 2, wherein gases exhausted from the oxidizing treatment pass through a plurality of suspension heat exchanger stages and are treated with water or milk of lime in the last suspension heat exchanger stage for separation of heavy metals or a combination with halides.

9. The process of claim 2, wherein the sorbent, which has been withdrawn from the oxidizing treatment, is cooled.

10. The process of claim 9, wherein the sorbent is cooled in conjunction with preheating of sorbent to be introduced in the fluidized bed reactor.

11. The process of claim 9, wherein the sorbent is cooled in conjunction with preheating of air to be introduced into the fluidized bed reactor.

12. The process of claim 9, wherein the cooled sorbent is subjected to a classifying treatment.

13. The process of claim 2, wherein exhaust gases of the fluidized bed reactor contain entrained sorbent which is separated as a fine grain fraction in a classification treatment and which fine grain fraction is fed with preference to the stage for the oxidizing treatment.

14. The process of claim 2, wherein the laden sorbent containing $CaCO_3$ and the withdrawn partial stream is subjected to the oxidizing treatment to generate said sorbent with release of chemically bound carbon dioxide.

15. The process of claim 14, wherein the partial stream of laden sorbent contains sulfite which is oxidized to sulfate in said oxidizing treatment.

16. The process of claim 1, wherein the fresh sorbent is introduced into the stage in which the oxidizing treatment is carried out.

17. The process of claim 1, wherein the fresh sorbent is introduced into the circulating fluidized bed.

18. A process of removing pollutants consisting substantially of sulfur oxides from a $CO_2$ containing exhaust gas comprising:

introducing the exhaust gas at a temperature below 150° C. into a circulating fluidized bed system consisting of a fluidized bed reactor, a separator and a return line; introducing a calcium compound containing sorbent into the fluidized bed reactor for intimate contact with the flue gases to produce a laden sorbent; withdrawing a partial stream of said laden sorbent from the circulating fluidized bed and subjecting the partial stream to an oxidizing treatment at a temperature of 600° to 1200° C. to generate said sorbent by decomposition of $CaCO_3$ formed in a side reaction with $CO_2$ of the exhaust gas; recycling a predominate part of the sorbent which has been subjected to the oxidizing treatment to the circulating fluidized bed; removing a partial stream which contains the used sorbent mainly in the form of calcium sulfate from the process; and introducing fresh sorbent into the process, at a rate corresponding to the rate at which used sorbent is removed from the process.

* * * * *